US012513512B2

(12) United States Patent
Kneckt et al.

(10) Patent No.: US 12,513,512 B2
(45) Date of Patent: Dec. 30, 2025

(54) ENCRYPTING MAC HEADER FIELDS FOR WLAN PRIVACY ENHANCEMENT

(71) Applicant: Apple Inc., Cupertino, CA (US)

(72) Inventors: Jarkko L. Kneckt, Los Gatos, CA (US); Charles F. Dominguez, San Carlos, CA (US); Daniel R. Borges, San Francisco, CA (US); Debashis Dash, San Jose, CA (US); Elliot S. Briggs, Carmel, CA (US); Sidharth R. Thakur, San Jose, CA (US); Su Khiong Yong, Palo Alto, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 355 days.

(21) Appl. No.: 17/966,560

(22) Filed: Oct. 14, 2022

(65) Prior Publication Data
US 2023/0232218 A1    Jul. 20, 2023

Related U.S. Application Data

(60) Provisional application No. 63/299,806, filed on Jan. 14, 2022.

(51) Int. Cl.
*H04W 12/03* (2021.01)
*H04L 5/00* (2006.01)
*H04W 84/12* (2009.01)

(52) U.S. Cl.
CPC ........... *H04W 12/03* (2021.01); *H04L 5/0055* (2013.01); *H04W 84/12* (2013.01)

(58) Field of Classification Search
CPC ... H04W 12/03; H04W 84/12; H04W 12/033; H04W 12/71; H04W 12/02; H04L 5/0055
See application file for complete search history.

(56) References Cited

U.S. PATENT DOCUMENTS 8,880,896 B1 * 11/2014 Elliott .................. H04L 9/0838
713/185
8,954,746 B2 * 2/2015 Tachibana ............. H04W 12/04
380/259

(Continued)

FOREIGN PATENT DOCUMENTS

JP    2010/114885 A    5/2010
JP    2018/050314 A    3/2018

OTHER PUBLICATIONS

Japanese Office Action directed to related Japanese Patent Application No. 2023-001260, mailed Jan. 5, 2024; 8 pages.

(Continued)

*Primary Examiner* — Dhaval V Patel
(74) *Attorney, Agent, or Firm* — Sterne, Kessler, Goldstein & Fox P.L.L.C.

(57) ABSTRACT

Embodiments are disclosed for encrypting media access control (MAC) Header fields for Wireless LAN (WLAN) privacy enhancement. For example, a transceiver of a station (STA) or an access point (AP) can set a real time Media Access Control (MAC) header bit in a payload of an aggregated MAC Protocol Data Unit (A-MPDU) subframe to an actual value of a power management (PM) field of a MAC header of the A-MPDU subframe. The transceiver can encrypt the payload, set the PM field to an over the air (OTA) PM value, and transmit the A-MPDU subframe over the air. The OTA PM value can include all zeros, a predetermined value, or a randomized value The transceiver can also set static MAC header bits in the payload of the A-MPDU subframe to corresponding actual values of an aggregated MAC service data unit (A-MSDU) present field of the A-MPDU subframe.

20 Claims, 12 Drawing Sheets

(56) References Cited

U.S. PATENT DOCUMENTS

| | | |
|---|---|---|
| 9,614,935 B2 | 4/2017 | Wentink et al. |
| 9,749,901 B2* | 8/2017 | Seok .................... H04L 67/568 |
| 2015/0082390 A1* | 3/2015 | Flink .................. H04W 12/068 |
| | | 726/4 |
| 2016/0285834 A1* | 9/2016 | Lee ......................... H04L 69/22 |
| 2017/0208472 A1* | 7/2017 | Wentink ................ H04L 63/123 |

OTHER PUBLICATIONS

Derham, T. (Broadcom): "Privacy Protection Gaps", IEEE Draft; vol. 802.11bi, No. 1, Sep. 29, 2021 (Sep. 29, 2021), pp. 1-10.
Extended European Search Report from the European Patent Office, directed to related European Application No. 22215942.8, mailed May 12, 2023, 9 pages.
IEEE P802.11 REVme_D0.0, Draft Standard for Information technology—Telecommunications and Information Exchange between Systems Local and Metropolitan Area Networks—Specific Requirements, Part 11: Wireless LAN Medium Access Control (MAC) and Physical Layer (PHY) Specifications; 4,608 pages.

* cited by examiner

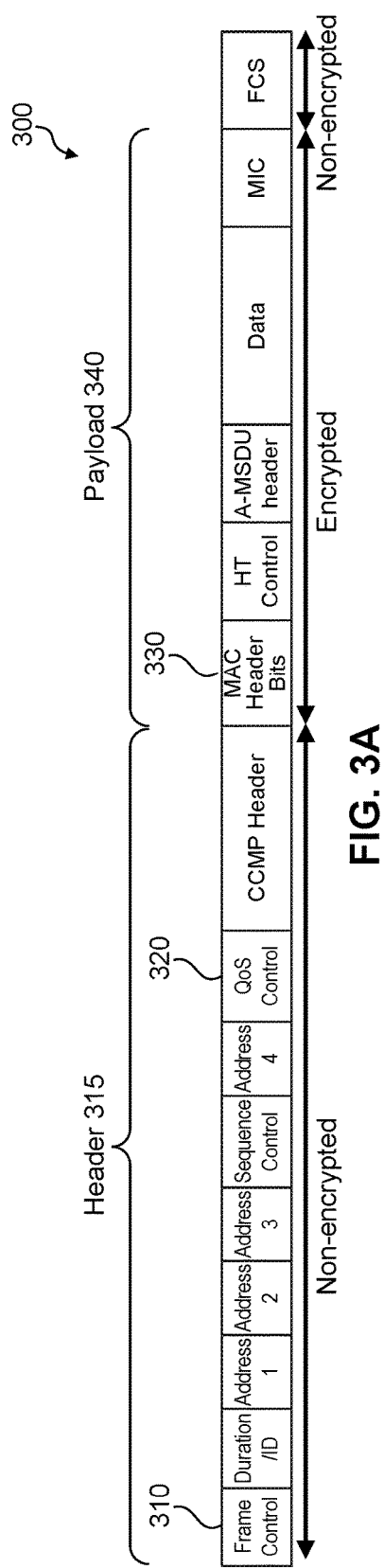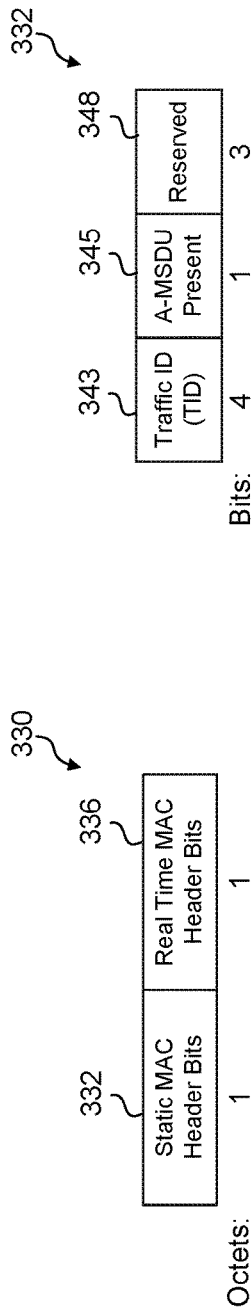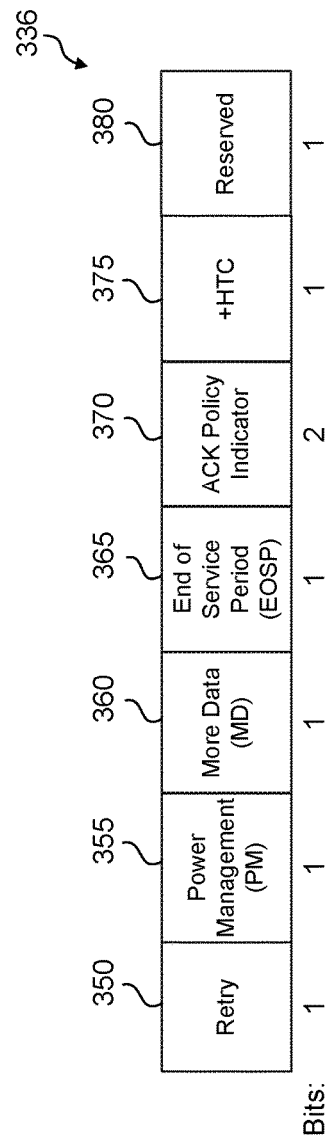

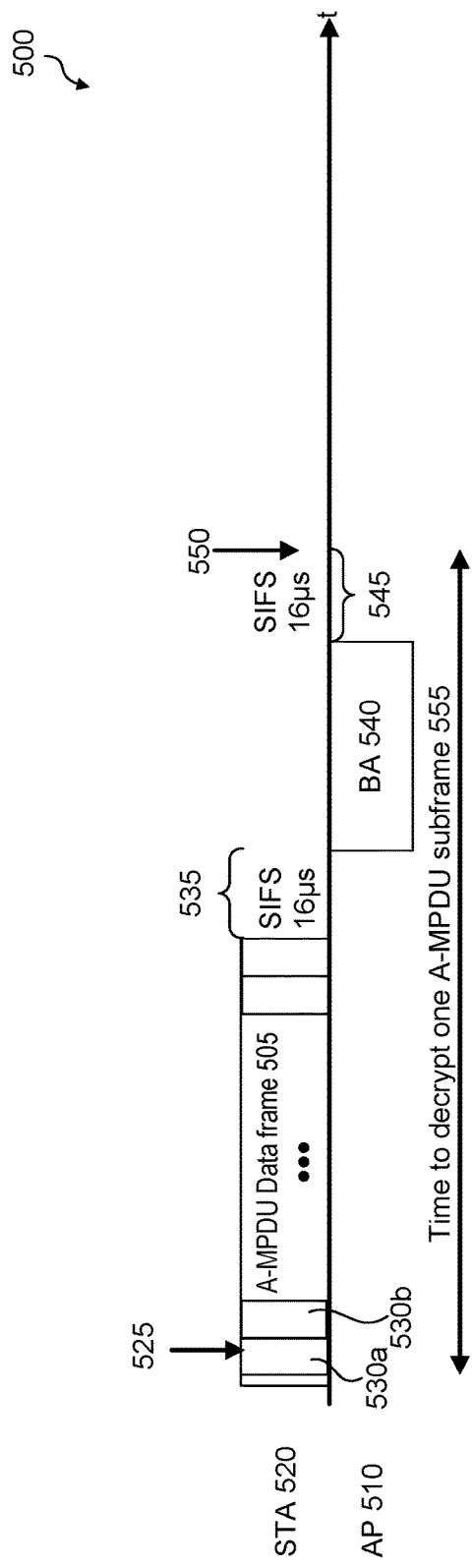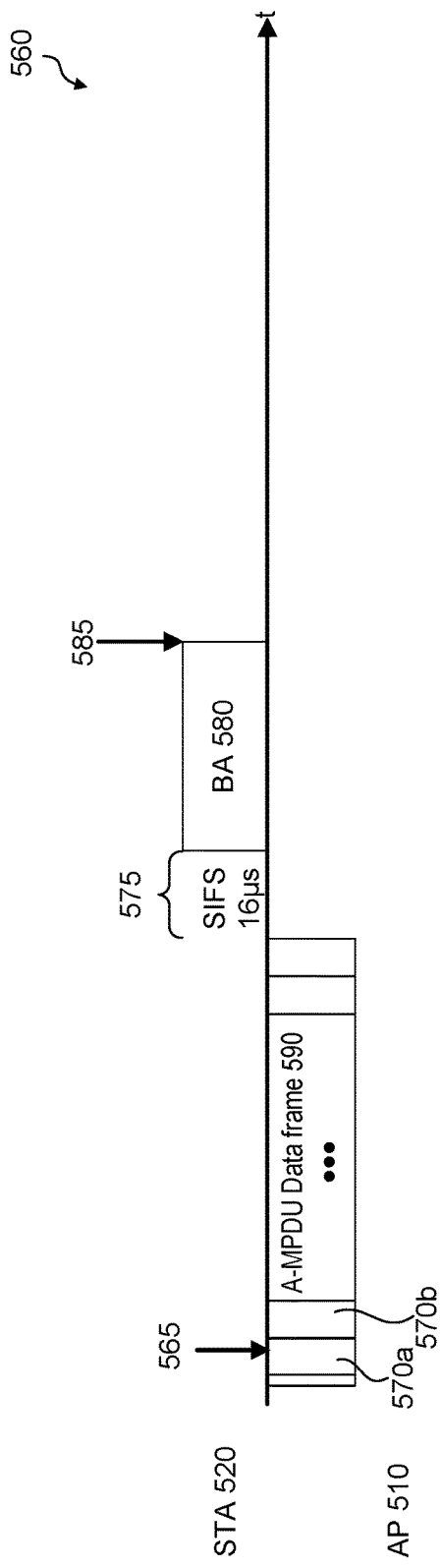

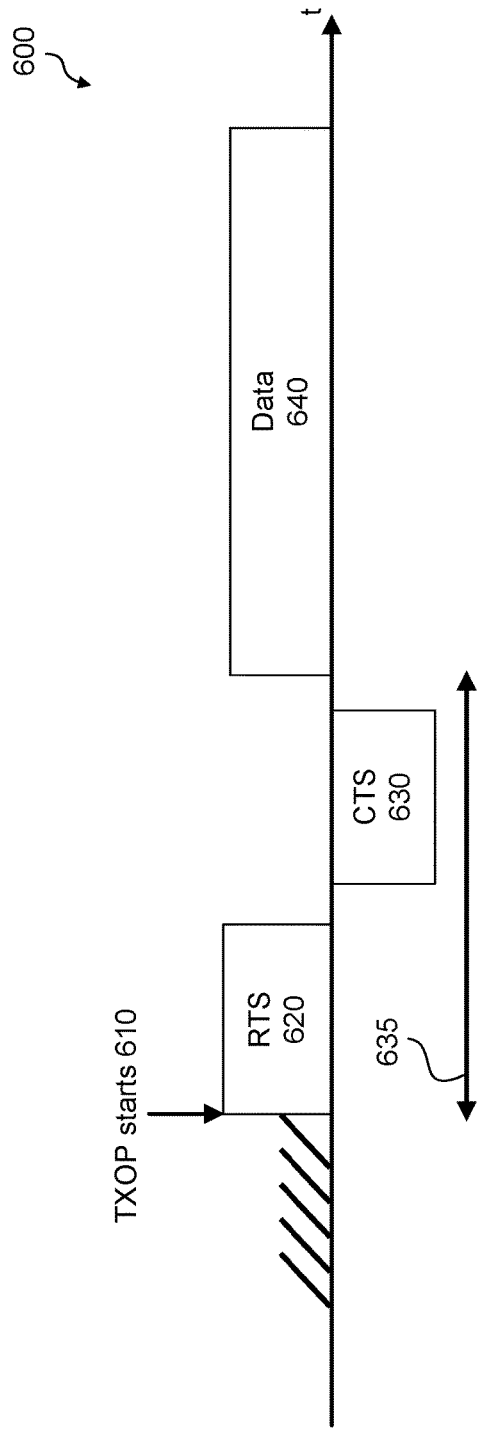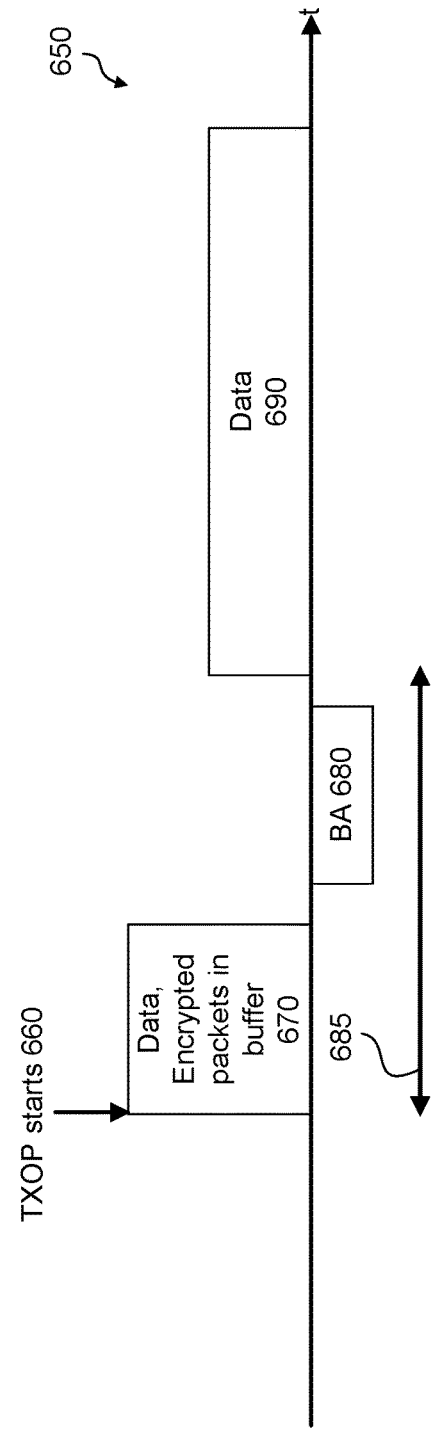

ENCRYPTING MAC HEADER FIELDS FOR WLAN PRIVACY ENHANCEMENT

CROSS-REFERENCE TO RELATED APPLICATION

This application claims benefit of U.S. Provisional Patent Application No. 63/299,806, filed on Jan. 14, 2022, which is incorporated herein by reference in its entirety.

BACKGROUND

Field

The embodiments relate generally to privacy for wireless devices transmitting in a wireless communication system.

Related Art

Wireless local area network (WLAN) communications are described in IEEE P802.11REVme_D0.0, Draft Standard for Information technology—Telecommunications and information exchange between systems Local and metropolitan area networks—Specific requirements, Part 11: Wireless LAN Medium Access Control (MAC) and Physical Layer (PHY) Specifications "IEEE P802.11REVme".

SUMMARY

Some embodiments include an apparatus, method, and computer program product for encrypting media access control (MAC) Header fields for Wireless LAN (WLAN) privacy enhancement. A client device (e.g., wireless station, wireless communication device, smart phone, laptop, computing device) implementation may have identifiable characteristics during association with another electronic device. These identifiable characteristics can include, for example, how often and under what conditions the client device enters power save mode. These identifiable characteristics may be externally visible in unprotected signaling, and can be used to identify (e.g., fingerprint) and track the client device (e.g., unauthorized tracking of the client device). Some embodiments provide privacy enhancements for wireless stations (STA) and/or access points (APs) that prevent unauthorized identification and tracking by encrypting certain MAC Header fields of transmitted data frames.

Some embodiments include a station (STA) that includes a transceiver communicatively coupled to a processor. In some embodiments, an access point (AP) includes a transceiver communicatively coupled to a processor. The processor of the STA and/or the AP can be configured to set a bit of real time Media Access Control (MAC) header in a payload of an aggregated MAC Protocol Data Unit (A-MPDU) subframe to an actual value associated with a power management (PM) field of a header of the A-MPDU subframe, and then encrypt the payload. After encrypting the payload, the processor can set the PM field in the header to an over the air (OTA) PM value, and transmit the A-MPDU subframe (e.g., over the air.) In some examples, encrypting the payloadoccurs during an exchange of request to send (RTS) and clear to send (CTS) messages, and/or during a transmission of previously buffered packets.

In some examples, the real time MAC header further includes one or more bits corresponding to an actual value from one or more additional fields in the header, where the one or more additional fields can include but are not limited to: a retry field, a more data (MD) field, an end of service period (EOSP) field, an ACK policy indicator field, and/or a +HTC field. Subsequent to encrypting the payload, the processor can set or replace the corresponding actual values of the one or more additional fields in the header with corresponding OTA values. The OTA values can include: all zeros, a predetermined value, or a randomized value. In some embodiments, the OTA values can be determined based on the predetermined and/or randomized value.

In some embodiments, the processor can be further configured to set a bit of one or more static MAC header bits in the payload of the A-MPDU subframe to corresponding actual values associated with a field in the header, where the field can include a traffic ID (TID) field or an aggregated MAC service data unit (A-MSDU) present field.

In some embodiments, the processor can be configured to receive a second A-MPDU subframe, and perform one or more real time operations for block acknowledgement (BA) based at least on one or more OTA values in a second header of the second A-MPDU subframe, where the one or more OTA values include a traffic identifier (TID)_OTA value. The processor can restore a TID field value in the second header based at least on the TID_OTA value.

In some examples, the second A-MPDU subframe can include a second PM field in the second header that includes a second OTA PM value, and decrypt a second payload of the second A-MPDU subframe. The processor can determine a second actual value for the second PM field based at least on decrypting the second payload, and set the second PM field in the second header to the second actual value. In some embodiments, a minimum time for the determination of the second actual value for the second PM field begins at the reception of the second A-MPDU subframe and ends after a short interframe space (SIFS) subsequent to the transmission of the BA.

In some embodiments, the processor is configured to determine a value of an end of service period (EOSP) field or a more data (MD) field based at least on decrypting the second payload. When the processor corresponds to a STA, the earliest time for the STA to return to a doze state begins at the reception of the second A-MPDU subframe and ends after the transmission of the BA. When the processor corresponds to a STA, the processor can transmit an association request including a set of indications: real time MAC header bits encryption in transmission supported, real time MAC header bits decryption in reception supported, static MAC header bits encryption in transmission supported, or static MAC header bits decryption in reception supported. The processor can receive an association response (e.g., from an AP) subsequent to the transmission of the association request, indicating the AP's support that can include real time MAC header bits encryption in transmission supported, real time MAC header bits decryption in reception supported, static MAC header bits encryption in transmission supported, and/or static MAC header bits decryption in reception supported.

When the processor corresponds to an AP, the processor can receive an association request from a STA that includes one or more indications: real time MAC header bits encryption in transmission supported, real time MAC header bits decryption in reception supported, static MAC header bits encryption in transmission supported, and/or static MAC header bits decryption in reception supported. In response, the AP can transmit an association response indicating the APs support including values for real time MAC header bits encryption in transmission supported, real time MAC header bits decryption in reception supported, static MAC header bits encryption in transmission supported, and/or static MAC header bits decryption in reception supported.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 3A illustrates a MAC frame format supporting encryption of MAC header fields for WLAN privacy enhancement, according to some embodiments of the disclosure.

FIG. 3B illustrates MAC header bits supporting encryption of MAC header fields for WLAN privacy enhancement, according to some embodiments of the disclosure.

FIG. 3C illustrates static MAC header bits supporting encryption of MAC header fields for WLAN privacy enhancement, according to some embodiments of the disclosure.

FIG. 3D illustrates real time MAC header bits supporting encryption of MAC header fields for WLAN privacy enhancement, according to some embodiments of the disclosure.

FIG. 5A illustrates a first example for handling real time MAC header bits, according to some embodiments of the disclosure.

FIG. 5B illustrates a second example for handling real time MAC header bits, according to some embodiments of the disclosure.

FIG. 6A illustrates an example of encryption time during transmission of initiation frames, according to some embodiments of the disclosure.

FIG. 6B illustrates another example of encryption time during transmission of previously buffered packets, according to some embodiments of the disclosure.

Figure 1:
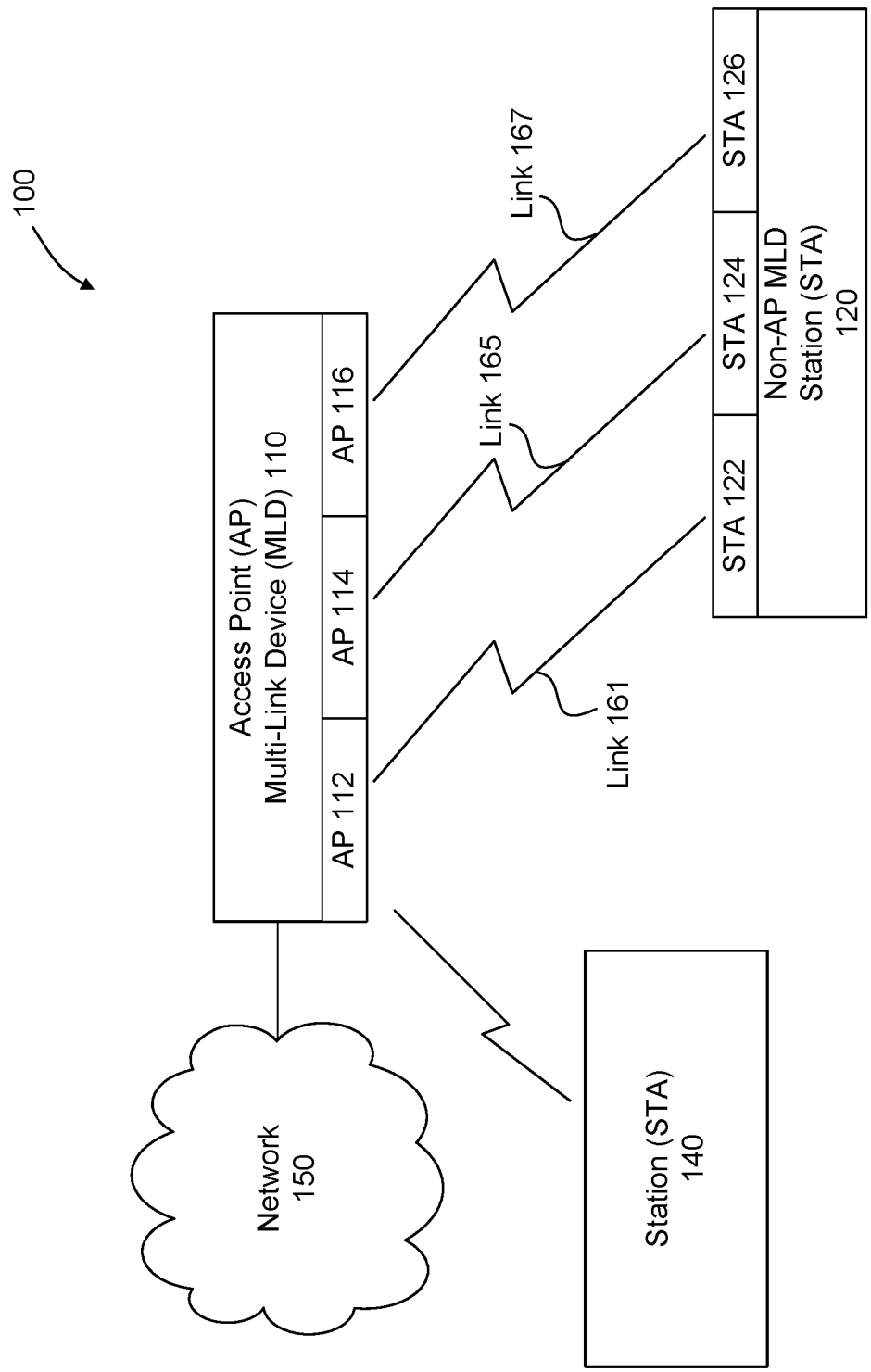
FIG. 1 illustrates an example system for encrypting media access control (MAC) header fields for wireless local area network (WLAN) privacy enhancement, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments include an apparatus, method, and computer program product for encrypting media access control (MAC) header fields for wireless local area network (WLAN) privacy enhancement. Some MAC header fields can be used to identify a manufacturer and/or radio chip/driver version of the client device. For example, More Data (MD), end of service period (EOSP), and/or power management (PM) fields can be used (e.g., by a hacker) to identify, track, or profile a client device. Some embodiments enable encryption of one or more of the MAC header fields to enable privacy enhancement (PE) of the client device, where the embodiments prevent fingerprinting, tracing, tracking, and/or profiling of the client device.

Some embodiments include encrypting actual values of the MAC header fields (e.g., PM, MD, EOSP) in the encrypted payload of a MAC frame. The MAC header fields that previously contained the actual values can be set to all zeroes (e.g., zeroed out), include a dummy value (e.g., a predetermined value), and/or include a randomized value. Some embodiments include configuring MAC header bit field values of the client device during association. Some embodiments include a block acknowledgement process that occurs when MAC header fields (e.g., PM, MD, EOSP) are encrypted.

FIG. 1 illustrates an example system 100 for encrypting MAC header fields for WLAN privacy enhancement, in accordance with some embodiments of the disclosure. System 100 includes access point (AP) multi-link device (MLD) 110 that provides non-AP MLD station (STA) 120, and STA 140 with access to network 150. AP MLD 110 may include multiple APs that correspond to a particular link. For example, AP 112 can communicate via 2.4 GHz identified by link 161; AP 114 can communicate via 5 GHz identified by link 165, and AP 116 can communicate via 6 GHz identified by link 167. AP 112, AP 114, and AP 116 may each have a radio transceiver that operates independently from the other radio transceivers. For example, AP MLD 110 can utilize one or more radios (e.g., 3 transceivers) to communicate over multiple links (e.g., over one or more frequency bands) to non-AP MLD STA 120. For example, AP MLD 110 can utilize transceivers of AP 112, AP 114, and/or AP 116 to communicate with non-AP MLD STA 120 via link 161, link 165, and/or link 167.

Non-AP MLD STAs 122, 124, 126, and STA 140 in proximity to AP MLD 110 may associate with AP MLD 110. For example, Non-AP MLD STA 120 can scan and identify AP MLD 110 across all three links. After associating with AP MLD 110, non-AP MLD STA 120 can communicate via any of the links link 161, link 165, and/or link 167 that are available in, for example, three different frequency bands, e.g., 2.4 GHz, 5 GHz, and 6 GHz. If one link is busy, non-AP MLD STA 120 or AP MLD 110 selects another link that is first available.

STA 140 can be a non-MLD STA (e.g., a STA with a single transceiver). STA 140 may communicate with AP MLD 110 via one of AP 112, AP 114, or AP 116. Non-AP MLD STAs 122, 124, 126, and/or STA 140, can be electronic devices that may include but are not limited to a cellular phone, a smart phone, a tablet, a personal digital assistant (PDA), or a laptop. Network 150 may include but is not limited to, any of or any combination of local area networks (LANs), metropolitan area networks (MANs), wireless local area networks (WLANs), and/or the Internet. In some embodiments, AP 110 may not be a MLD, where AP 110 may include a single transceiver.

Figure 2:
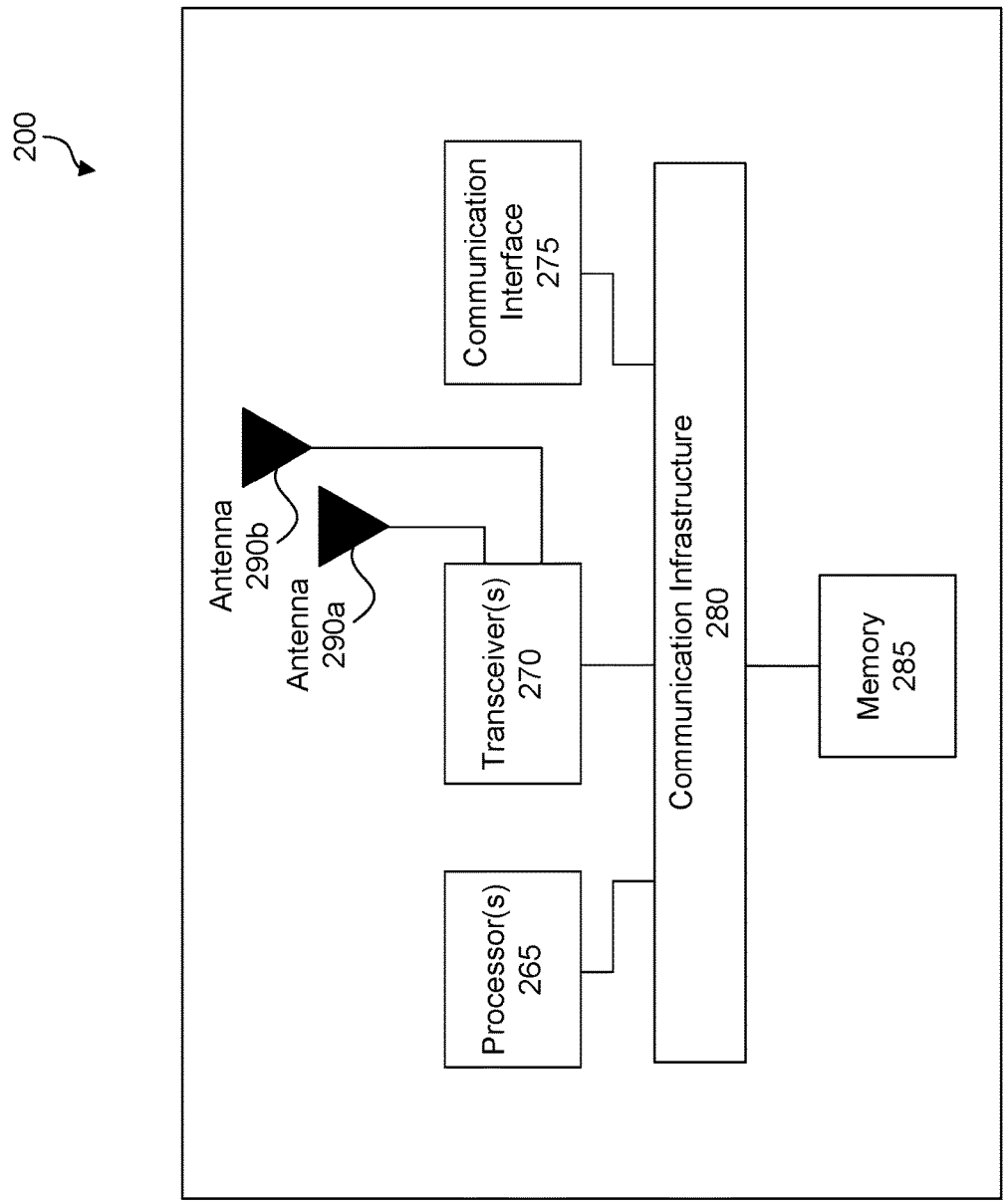
FIG. 2 illustrates a block diagram of an example wireless system supporting encryption of MAC header fields for WLAN privacy enhancement, according to some embodiments of the disclosure.

FIG. 2 illustrates a block diagram of example wireless system 200 supporting encryption of MAC header fields for WLAN privacy enhancement, according to some embodiments of the disclosure. For explanation purposes and not a limitation, FIG. 2 may be described with reference to elements from FIG. 1. For example, system 200 may be any of the electronic devices: AP MLD 110, AP 112, AP 114, AP 116, non-AP MLD STA 120, STA 122, STA 124, STA 126, or STA 140 of system 100. System 200 includes one or more processors 265, transceiver(s) 270, communication interface 275, communication infrastructure 280, memory 285, and antenna 290. Memory 285 may include random access memory (RAM) and/or cache, and may include control logic (e.g., computer instructions) and/or data. One or more processors 265 can execute the instructions stored in memory 285 to perform operations enabling wireless system 200 to transmit and receive wireless communications, including the functions for encryption of MAC header fields for WLAN privacy enhancement herein. In some embodiments, one or more processors 265 can be "hard coded" to perform the functions herein. Transceiver(s) 270 transmits and receives wireless communications signals including wireless communications supporting encryption of MAC header fields for WLAN privacy enhancement according to some embodiments, and may be coupled to one or more antennas 290 (e.g., 290*a*, 290*b*). In some embodiments, a transceiver 270*a* (not shown) may be coupled to antenna 290*a* and different transceiver 270*b* (not shown) can be coupled to antenna 290*b*. Communication interface 275 allows system 200 to communicate with other devices that may be wired and/or wireless. Communication infrastructure 280 may be a bus. Antenna 290 may include one or more antennas that may be the same or different types.

FIG. 3A illustrates MAC frame 300 supporting encryption of MAC header fields for WLAN privacy enhancement, according to some embodiments of the disclosure. For explanation purposes and not a limitation, FIG. 3A may be described with reference to elements from FIGS. 1 and 2. For example, AP MLD 110, AP 112, AP 114, AP 116, Non-AP MLD STA 120, STA 122, STA 124, STA 126, or STA 140 of FIG. 1 can transmit or receive MAC frame 300. In some examples, wireless system 200 can transmit and/or receive MAC frame 300.

Certain MAC header fields in Frame Control field 310 and/or Quality of Service (QoS) Control field 320 of header 315 that are not encrypted can be used to identify (e.g., fingerprint) a STA or an AP where the STA or AP can be tracked. To improve privacy, some embodiments include identifying those certain MAC header fields, inserting the actual values of those certain MAC header fields in MAC header bits 330 as part of payload 340 that is then encrypted as shown in FIG. 3A. In some embodiments, those certain MAC header fields in Frame Control field 310 can include: retry field 412, power management (PM) field 414, more data (MD) field 416, +HTC field 418 of FIG. 4A, end of service period (EOSP) field 454 and/or ACK policy indicator 456 of FIG. 4B. Those certain MAC header fields in QoS Control field 320 can include: traffic ID (TID) field 452, aggregated MAC service data unit (A-MSDU) present field 458 of FIG. 4B (described below).

To prevent identification and fingerprinting of the STA or AP, corresponding OTA values can be inserted into TID field 452, A-MSDU present field 458, retry field 412, PM field 414, MD field 416, +HTC field 418, EOSP field 454 and/or ACK policy indicator 456 corresponding to Frame Control field 310 and/or QoS Control field 320 that are not encrypted where the corresponding OTA values may be all zeroes, a predetermined (e.g., dummy) value, or a randomized value. MAC frame 300 can be included in an aggregated MAC protocol data unit (A-MPDU) subframe, and can then be transmitted OTA to a receiver. Since the actual values of those certain MAC header fields in MAC header bits 330 are encrypted when MAC frame 300 is transmitted OTA, even if MAC frame 300 is intercepted (e.g., by an attacker), only the OTA values (e.g., all zeroes, dummy values, or randomized values) are visible obtained. Accordingly, the STA or AP cannot be fingerprinted or identified based on those certain MAC header fields.

When the aggregated MAC protocol data unit (A-MPDU) subframe is received, the receiver can transmit block acknowledgement (BA) based on OTA values within header 315 before decrypting payload 340. After the BA is transmitted, payload 340 can be decrypted to obtain the actual values from MAC header bits 330. Those certain MAC header fields of Frame Control field 310 and/or QoS Control field 320 can then be set to the decrypted actual values from MAC header bits 330. In other words, after the corresponding actual values are recovered from the decrypted payload, the certain MAC header fields of Frame Control field 310 and/or QoS Control field 320 can be restored with the corresponding actual values. Thus, the privacy of the STA and/or AP is improved.

FIG. 3B illustrates MAC header bits 330 supporting encryption of MAC header fields for WLAN privacy enhancement, according to some embodiments of the disclosure. MAC header bits 330 includes static MAC header bits 332 and real time MAC header bits 336. A transmitter may not have to change a value of static MAC header bits 332 between transmissions of physical (PHY) protocol data units (PPDUs). A PPDU may include one or more A-MPDU subframes, where each A-MPDU subframe of the PPDU can include an identical MAC header. For example, a transmitter can encrypt static MAC header bits 332 along with payload 340 of MAC frame 300. A receiver can receive an A-MPDU subframe including MAC frame 300 and BA may be transmitted before decryption of payload 340 (and hence before the decryption of static MAC header bits 332).

A transmitter may have to change the value of real time MAC header bits 336 between PPDUs and MAC frame 300 may be re-encrypted. For example, a receiving AP determines the value of real time MAC header bits 336 to prepare for the next downlink transmission. A receiving non-AP STA determines the value of real time MAC header bits 336 by the next transmit opportunity (TXOP) to prepare for a next transmission.

Figure 4A:
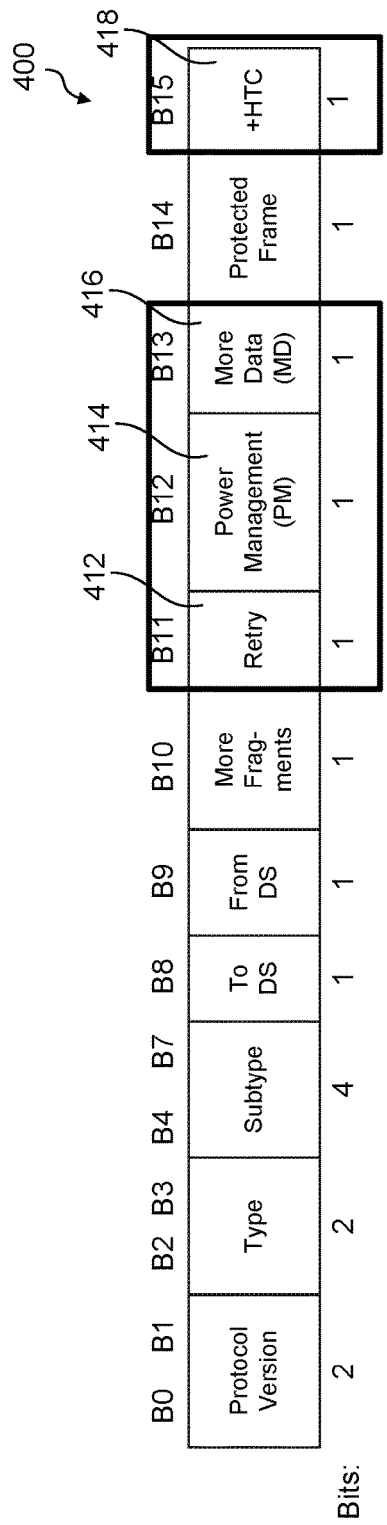
FIG. 4A illustrates a Frame Control field, according to some embodiments of the disclosure.
Figure 4B:
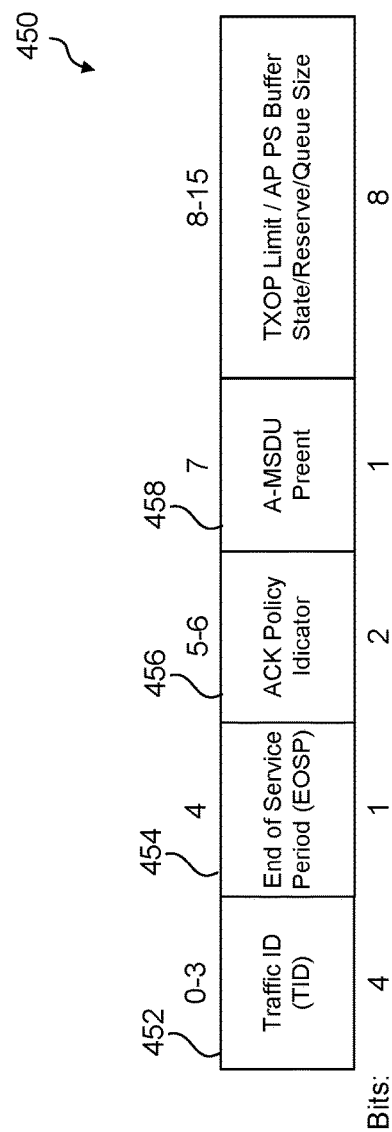
FIG. 4B illustrates a quality of service (QoS) Control field, according to some embodiments of the disclosure.

FIG. 3C illustrates static MAC header bits 332 supporting encryption of MAC header fields for WLAN privacy enhancement, according to some embodiments of the disclosure. Static MAC header bits 332 includes traffic ID (TID) field 343, aggregated MAC service data unit (A-MSDU) present field 345, and reserved field 348. For explanation purposes and not a limitation, FIG. 3C may be described with reference to elements from other figures in the disclosure. For example, FIG. 4B illustrates QoS Control field 450, according to some embodiments of the disclosure. For example, QoS Control field 320 of header 315 in FIG. 3A maybe the same as QoS Control field 450 of FIG. 4B, and TID field 343 and/or A-MSDU present field 345 may contain the corresponding actual values of TID field 452 and/or A-MSDU present field 458 of FIG. 4B.

FIG. 3D illustrates real time MAC header bits 336 supporting encryption of MAC header fields for WLAN privacy enhancement, according to some embodiments of the disclosure. For explanation purposes and not a limitation, FIG. 3D may be described with reference to elements from other figures in the disclosure. For example, FIG. 4A illustrates Frame Control field 400, according to some embodiments of the disclosure. Frame Control field 400 can be the same as Frame Control field 310 of header 315. Real time MAC header bits 336 can include retry field 350, PM field 355, MD field 360, EOSP field 365, ACK policy indicator 370, +HTC field 375, and reserved field 380 that may include actual values of corresponding fields: retry field 412, PM field 414, MD field 416, +HTC field 418 of FIG. 4A, EOSP field 454 and/or ACK policy indicator 456 of FIG. 4B.

For example, TID field 452, A-MSDU present field 458, retry field 412, PM field 414, MD field 416, +HTC field 418, EOSP field 454 and/or ACK policy indicator 456 corresponding to Frame Control field 310 and/or QoS Control field 320 in header 315 are not encrypted and can be used to identify (e.g., fingerprint) a STA or an AP where the STA or AP can be tracked. To improve privacy, some embodiments include inserting (e.g., copying and/or moving) the corresponding actual values of TID field 452, A-MSDU present field 458, retry field 412, PM field 414, MD field 416, +HTC field 418, EOSP field 454 and/or ACK policy indicator 456 corresponding to Frame Control field 310 and/or QoS Control field 320 in header 315 that are not encrypted to MAC header bits 330 of payload 340. MAC header bits 330 is then encrypted as part of payload 340 of MAC frame 300 as shown in FIG. 3A. To prevent identification and fingerprinting of the STA or AP, corresponding OTA values are inserted into TID field 452, A-MSDU present field 458, retry field 412, PM field 414, MD field 416, +HTC field 418, EOSP field 454 and/or ACK policy indicator 456 corresponding to Frame Control field 310 and/or QoS Control field 320 in header 315 that are not encrypted where the corresponding OTA values may be all zeroes, a predetermined (e.g., dummy) value, or a randomized value. MAC frame 300 can be included in an aggregated MAC protocol data unit (A-MPDU) subframe, and can then be transmitted OTA to a receiver. Since the actual values of those certain MAC header fields in MAC header bits 330 are encrypted in payload 340 when MAC frame 300 is transmitted OTA, even if MAC frame 300 is intercepted (e.g., by an attacker), only the OTA values within header 315 can be obtained.

When the A-MPDU subframe is received, the receiver can transmit BA based on OTA values within header 315 before decrypting payload 340. After the BA is transmitted, payload 340 can be decrypted to obtain the actual values from MAC header bits 330. Then, the corresponding actual values within TID field 343, A-MSDU present field 345, retry field 350, PM field 355, MD field 360, EOSP field 365, ACK policy indicator 370, and/or +HTC field 375 in MAC header bits 330 can then be copied to or inserted to replace the OTA values within the following fields: TID field 452, A-MSDU present field 458, retry field 412, PM field 414, MD field 416, +HTC field 418 of FIG. 4A, EOSP field 454 and/or ACK policy indicator 456 of Frame Control field 310 and/or QoS Control field 320 in header 315. Thus, the privacy of the STA and/or AP is enhanced.

FIG. 5A illustrates example 500 for handling real time MAC header bits, according to some embodiments of the disclosure. For explanation purposes and not a limitation, FIG. 5A may be described with reference to elements from other figures in the disclosure. For example, STA 520 may be non-AP MLD STA 120, STA 122, STA 124, STA 126, or STA 140 of FIG. 1. In addition, AP 510 may be AP MLD 110, AP 112, AP 114, or AP 116. As described above, if actual values of PM field 414 of FIG. 4A are transmitted OTA, an attacker may be able to discern information to identify and track STA 520 and/or AP 510. Accordingly, the actual values of PM field 414 can be copied and/or moved to PM field 355 of MAC header bits 330 that are then encrypted before being transmitted OTA. PM field 414 can include a dummy value (e.g., zero) or a random value before STA 520 transmits MAC frame 300 OTA. The receiver of MAC frame 300 timely decrypts PM field 355 to determine whether or not to initiate a transmission to STA 520.

In example 500, STA 520 can transmit A-MPDU data frame 505 that includes A-MPDU subframe 530*a*, 530*b*, and other A-MPDU subframes that are received by AP 510. After transmission of A-MPDU data frame 505 and SIFS 535, AP 510 can transmit BA 540 to STA 520. STA 520 can operate in active mode or enter a power save mode. When STA 520 is in an active mode, AP 510 can send retransmissions (e.g., set retry field 350 of FIG. 3D in an A-MPDU subframe (not shown). In some examples (not shown), AP 510 can be replaced by another STA (e.g., for STA-STA communications) and STA 520 can transmit to another STA instead of AP 510.

STA 520 can enter a power save mode by determining and/or setting PM field 414 of Frame Control field 310 in header 315 to '1' to inform the receiver (e.g., AP 510, or another STA (not shown)) that STA 520 plans to enter a power save mode (e.g., a sleep mode). In some embodiments, the actual value of PM field 414 can be copied and/or moved to PM field 355 of MAC header bits 330 of payload 340 that are then encrypted before being transmitted OTA to AP 510. STA 520 can set PM field 414 of FIG. 4A in Frame Control field 310 in header 315 to an OTA PM value (e.g., zero) to keep the active or power save mode of STA 520 secure (e.g., hidden from an observer) when A-MPDU subframe 530*a* is transmitted OTA to a receiver, AP 510.

In some embodiments, the receiver (e.g., AP 510) decrypts A-MPDU subframe 530*a* (e.g., decrypts payload 340) in at least a time period beginning at time 525 with receipt of A-MPDU subframe 530*a* and ending at time 550. The time period can be identified by time to decrypt one A-MPDU subframe 555 shown as an arrow that starts at time 525 with receipt of A-MPDU subframe 530*a* that includes an encrypted payload 340 with encrypted PM field 355 set to '1', receipt of the remaining A-MPDU data frame 505, SIFS 535, BA 540, and SIFS 545, and ends at time 550. In other words, time 550 indicates the earliest time when AP 510 determines the status of PM field 355, and AP 510 determines whether to initiate a transmission to STA 520 (the A-MPDU data frame 505 transmitter.) AP 510 may not transmit to STA 520 before AP 510 determines a value of PM field 355 in the last A-MPDU subframe (e.g., A-MPDU subframe 530*a*).

After the decryption of at least subframe 530a, AP 510 can determine that PM field 355 of MAC header bits 330 is set to '1' and that STA 520 is entering a power save mode. In some embodiments, AP 510 decrypts MAC header bits 330 of payload 340 and inserts the actual value (e.g., '1') of decrypted PM field 355 to PM field 414 of Frame Control 310 in header 315. AP 510 can determine from the actual value of PM field 414 that STA 520 is entering a power save mode. Accordingly, AP 510 may buffer any retry transmissions intended for STA 520 until STA 520 returns to active mode. In some embodiments, when AP 510 decrypts A-MPDU subframe 530a after time to decrypt one A-MPDU subframe 555 (e.g., PM field check is slow), AP 510 may delay any transmissions to STA 520 until after AP 510 receives uplink (UL) data from STA 520 (e.g., STA 520 returns to active mode). In some examples, AP 510 may transmit to other STAs and/or initiate TXOP obtaining later since STA 520 is in power save mode. In some embodiments, AP 510 can be replaced with another STA (e.g., for STA-STA communications.)

FIG. 5B illustrates example 560 for handling real time MAC header bits, according to some embodiments of the disclosure. For explanation purposes and not a limitation, FIG. 5B may be described with reference to elements from other figures in the disclosure. For example, STA 520 and AP 510 may be the same as STA 520 and AP 510 of FIG. 5A. In some embodiments, STA 520 can operate in power save mode using for example, target wake time (TWT) or unscheduled-automatic power save delivery (U-APSD). As described in example 500, STA 520 can determine an actual value of PM field 414 that signals whether STA 520 operates in active mode (PM='0') or power save mode (PM='1'). In some embodiments, AP 510 can transmit downlink (DL) data to STA 520 indicating that a service period ends and STA 520 can enter a power save mode (e.g., doze.) For example, AP 510 can determine from header 315, corresponding actual values of EOSP field 454 is equal to '1' and/or MD field 416 ='0'. AP 510 can copy or insert the corresponding actual values so that EOSP field 365 equals to '1' and/or MD field 360='0' in MAC header bits 330 of payload 340 that are encrypted before being transmitted OTA. AP 510 can determine and set OTA values (e.g., zeroes, dummy value, or randomized value) for EOSP field 454 and/or MD field 416 in header 315 before transmission OTA.

In example 560, AP 510 can transmit A-MPDU data frame 590 including A-MPDU subframes 570a, 570b, and so on. STA 520 can receive A-MPDU data frame 590, and after SIFS 575, transmit BA 580 to AP 510. The earliest time when STA 520 can enter a doze state is after a time period that begins at time 565 and ends at time 585. If STA 520 is not able to decrypt EOSP field 365 and/or MD field 360 in payload 340 in the time period above, then STA 520's power consumption may increase since STA 520 may not enter to a doze state at the earliest time, time 585. The increased power consumption may be justified in view of the increased privacy obtained by copying the actual values of EOSP field 454 and/or MD field 416 from header 315 to corresponding EOSP field 365 and/or MD field 360 in payload 340 that are encrypted before MAC frame 300 is transmitted OTA. EOSP field 454 and/or MD field 416 in header 315 may include a corresponding OTA value to maintain privacy of STA 520 and/or AP 510. STA 520 may continue to transmit UL frames to AP 510 regardless of the actual values of EOSP field 365 and/or MD field 360 after decryption.

In some examples (not shown), AP 510 can be replaced by another STA (e.g., for STA-STA communications) and another STA (instead of AP 510). To allow STA 520 to go into power save mode, then the other STA can set EOSP field 365 equal to '1' and/or MD field 360='0' in MAC frame 300 that is transmitted to STA 520. In some embodiments, the power management (PM) bit signaling can be used.

FIG. 6A illustrates example 600 of encryption time during transmission of initiation frames, according to some embodiments of the disclosure. For explanation purposes and not a limitation, FIG. 6A may be described with reference to elements from other figures in the disclosure. For example, a transmitter may be AP MLD 110, AP 112, AP 114, AP 116, non-AP MLD STA 120, STA 122, STA 124, STA 126, or STA 140 of FIG. 1, or system 200 of FIG. 2. In some examples, a transmitter of MAC frame 300 may need additional time to encrypt MAC header bits 330. Example 600 illustrates a transmitter obtaining more time for encryption during time 635. For example, a transmitter (e.g., a STA) may perform encryption starting at TXOP time 610 and continue during the exchange of request to send (RTS) 620 and/or clear to send (CTS) 630 messages, but before the transmission of a A-MPDU data frame 640 that can include one or more A-MPDU subframes that include MAC frame 300.

FIG. 6B illustrates example 650 of encryption time during transmission of previously buffered packets, according to some embodiments of the disclosure. For explanation purposes and not a limitation, FIG. 6B may be described with reference to elements from other figures in the disclosure. For example, a transmitter may be AP MLD 110, AP 112, AP 114, AP 116, non-AP MLD STA 120, STA 122, STA 124, STA 126, or STA 140 of FIG. 1. In example 650, a transmitter (e.g., a STA) may have already encrypted packets (e.g., MPDUs that are buffered). A TXOP starts at time 660, and the transmitter can perform encryption during time 685. The transmitter can perform encryption during the time that data, encrypted packets in buffer 670 is transmitted and corresponding BA 680 is received. For example, frames in data encrypted packets in buffer 670 transmitted by the STA may have PM field 355='0' indicating that the STA can continue to operate in active mode, encrypt another MAC frame 300 payload, and transmit within data 690 (e.g., a second frame.) Similarly, an AP may transmit frames in data encrypted packets in buffer 670 with EOSP field 365='1' to keep a receiver STA available to receive more frames from the AP. The second frame may be encrypted during time 685 and then a second frame in data 690 may result in the receiving STA transitioning to power save mode.

Figure 7A:
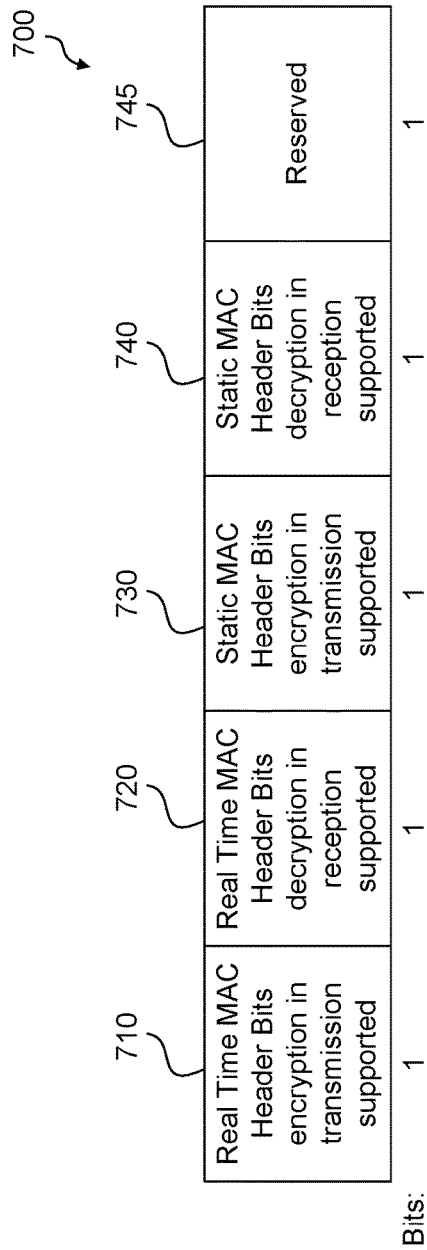
FIG. 7A illustrates an example of capability bits for configuring encryption of MAC header fields for WLAN privacy enhancement, according to some embodiments of the disclosure.
Figure 7B:
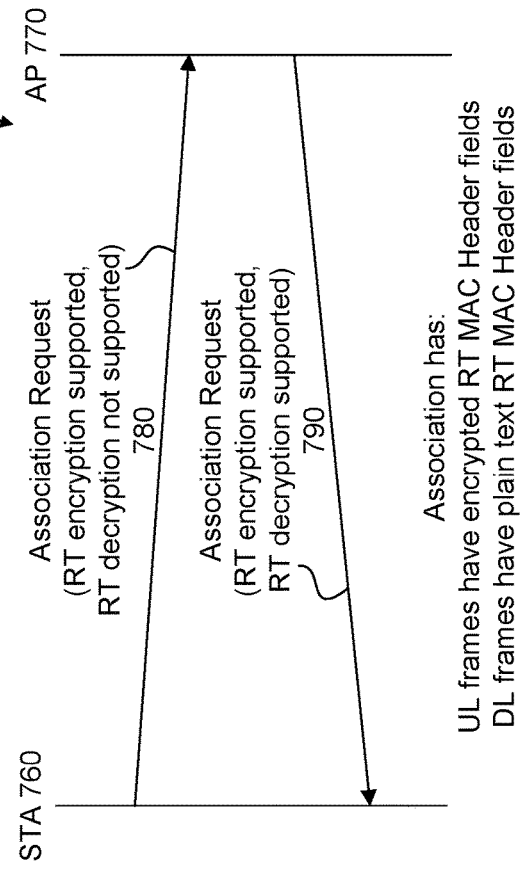
FIG. 7B illustrates an example of an association exchange supporting encryption of MAC header fields for WLAN privacy enhancement, according to some embodiments of the disclosure.

FIG. 7A illustrates example 700 of capability bits for configuring encryption of MAC header fields for WLAN privacy enhancement, according to some embodiments of the disclosure. FIG. 7B illustrates example 750 of an association exchange supporting encryption of MAC header fields for WLAN privacy enhancement, according to some embodiments of the disclosure. For explanation purposes and not a limitation, FIGS. 7A and 7B may be described with reference to elements from other figures in the disclosure. For example, STA 760 of example 750 may be non-AP MLD STA 120, STA 122, STA 124, STA 126, or STA 140 of FIG. 1, and AP 770 of example 750 may be AP MLD 110, AP 112, AP 114, or AP 116 of FIG. 1. STA 760 can transmit an association request message and receive an association response message from AP 770. The association request message and the association response message can include compatibility bits of example 700 that include: Real time MAC header bits encryption in transmission supported field 710, real time MAC header bits decryption in reception supported field 720, static MAC header bits encryption in transmission supported field 730, static MAC header bits decryption in reception supported field 740, and/or reserved field 745. For example, if a station supported real time MAC header bits 336 in transmission and reception, then the station may set real time MAC header bits encryption in transmission supported field 710 to '1' and real time MAC header bits decryption in reception supported field 720 to '1'. If the station supported static MAC header bits 332 in transmission and reception, then the station may set static MAC header bits encryption in transmission supported field 730 to '1' and static MAC header bits decryption in reception supported field 740 to '1'.

In some embodiments, STA 760 and/or AP 770 support static MAC header bits 332 that are encrypted before being transmitted OTA, thus example 700 may include real time MAC header bits encryption in transmission supported field 710, real time MAC header bits decryption in reception supported field 720, and reserved field 745 may increase to 6 bits. In some embodiments, real time MAC header bits 336 does not include PM field 355. Accordingly, PM field 414 of Frame Control field 310 includes the actual value of the PM bit when MAC frame 300 is transmitted OTA.

In some embodiments, real time MAC header bits 336 are not included in MAC header bits 330 of payload 340. Fields corresponding to real time MAC header bits 336 in Frame Control field 310 and/or QoS Control field 320 of header 315 (e.g., retry field 412, PM field 414, MD field 416, +HTC field 418 of FIG. 4A, EOSP field 454 and/or ACK policy indicator 456 of FIG. 4B) can include the corresponding actual values (rather than OTA values) when MAC frame 300 is transmitted OTA.

In example 750, static MAC header bits 332 are supported and are transmitted within MAC header bits 330. STA 760 may transmit an association request message 780 to AP 770 that indicates the capabilities of STA 760 to support real time MAC header bits 336. For example, STA 760 supports the following: real time encryption in transmission (e.g., real time MAC header bits encryption in transmission supported field 710='1'); but real time decryption is not supported (e.g., real time MAC header bits decryption in reception supported field 720='0'. In response, AP 770 may transmit an association response message 790 indicating the capabilities of AP 770 to support real time MAC header bits 336. For example, AP 770 supports real time encryption in transmission and real time decryption in reception. Accordingly, AP 770 may include the following in the association response message: real time encryption in transmission (e.g., real time MAC header bits encryption in transmission supported field 710='1'); and real time decryption is supported (e.g., real time MAC header bits dercryption in reception supported field 720='1'.

Figure 8:
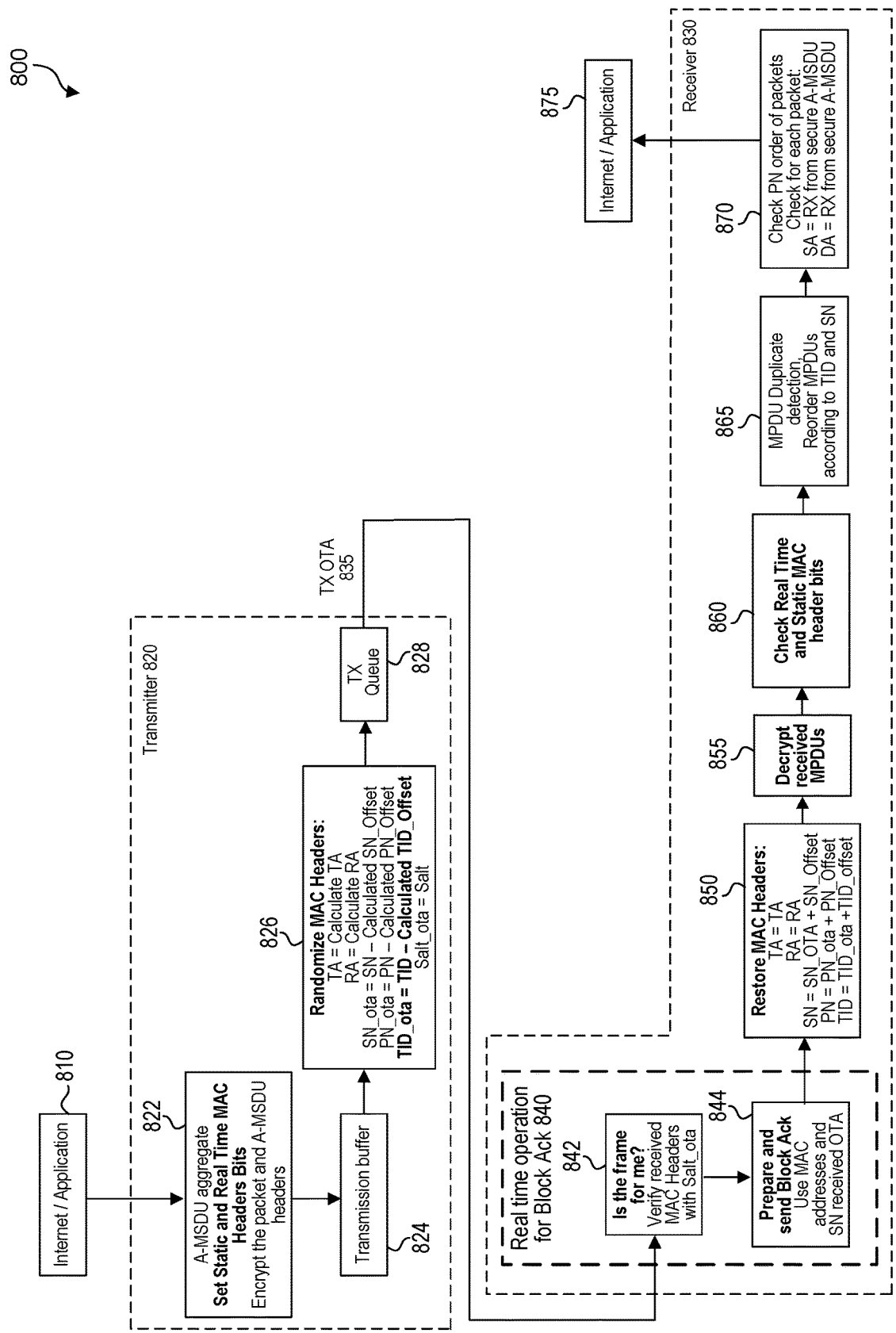
FIG. 8 illustrates an example transmitter and receiver supporting encryption of MAC header fields for WLAN privacy enhancement, according to some embodiments of the disclosure.

FIG. 8 illustrates example 800 of transmitter 820 and receiver 830 supporting encryption of MAC header fields for WLAN privacy enhancement, according to some embodiments of the disclosure. For explanation purposes and not a limitation, FIG. 8 may be described with reference to elements from other figures in the disclosure. For example, transmitter 820 can be AP MLD 110, AP 112, AP 114, AP 116, AP 110 that includes a single transceiver, non-AP MLD STA 120, STA 122, STA 124, STA 126, or STA 140 of FIG. 1. For example, receiver 830 can be AP MLD 110, AP 112, AP 114, AP 116, AP 110 that includes a single transceiver, non-AP MLD STA 120, STA 122, STA 124, STA 126, or STA 140 of FIG. 1. Transmitter 820 and/or receiver 830 can be system 200 of FIG. 2. Example 800 includes transmitter 820 that receives one or more A-MPDU frames from internet/application 810, supports encryption of MAC header fields for WLAN privacy enhancement, and transmits the one or more A-MPDUs OTA with encrypted MAC header bits 330 of FIG. 3A to receiver 830. Receiver 830 supports decryption of MAC header fields for WLAN privacy enhancement, and transmits the one or more A-MPDU frames to internet/application 875. In some embodiments, real time operation for block acknowlement (BA) 840 does not require receiver 830 to decrypt an A-MPDU frame before transmitting BA. In other words, receiver 830 can transmit BA based on unencrypted field information (e.g., OTA values). In some embodiments A-MPDU support in association signaling defines whether multi-TID data and BA may be transmitted in a link.

The functions of transmitter 820 and receiver 830 are described further below.

At 822, transmitter 820 (e.g., processor 265 of system 200) can receive and aggregate MSDUs to form A-MSDU as payload 340 of an A-MPDU subframe. Transmitter 820 sets static MAC header bits 332 and/or real time MAC header bits 336 of MAC header bits 330 that are included in payload 340 of the A-MPDU subframe. In some embodiments, transmitter 820 obtains corresponding actual values in fields of Frame Control field 310 and/or QoS Control field 320 of header 315 and copies or inserts the corresponding actual values in to the respective MAC header bits 330 of payload 340. Transmitter 820 encrypts the packet and A-MSDU headers. For example, transmitter encrypts payload 340 of MAC frame 300 as shown in FIG. 3A.

At 824, transmitter 820 transmits the packet to transmission buffer(s).

At 826, transmitter 820 randomizes fields in Frame Control field 310 and/or QoS Control field 320 that correspond to MAC header bits 330. Namely, the following fields may be populated with corresponding OTA values and/or patterns: TID field 452, A-MSDU present field 458, retry field 412, PM field 414, MD field 416, EOSP field 454, ACK policy indicator 456, and/or +HTC field 418. Other fields in the MAC header that can be randomized and replaced with an OTA value include transmitter address (TA), receiver address (RA), sequence number (SN), packet number (PN), and a Salt.

For example, after payload 340 is encrypted, transmitter 820 can determine OTA values for fields corresponding to MAC header bits 330. The randomization may include determining a randomized value (e.g., offset value), inserting all zeroes, or using a predefined value (e.g., dummy value). In some examples, an OTA value is determined based on an actual value, randomized value, and/or predefined value.

In some embodiments, a TID_Offset can be determined via randomization. The TID_OTA value can be determined from the actual value of a TID field and a calculated TID_Offset value (e.g., randomized value). In the event transmitter 820 transmits multi-TID A-MPDU, transmitter 820 sets the same TID_OTA value to QoS Control field 320 for the A-MPDUs with the same TID (e.g., all A-MPDU frames belonging to the same TID will have the same TID_OTA value.) The TID_OTA value may be changed for each transmitted PPDU or they may be configured for a period of time to the transmitter and the receiver.

At 828, transmitter 820 transmits the A-MPDU subframes to transmission queue(s).

At 835, transmitter 820 transmits the A-MPDU subframes OTA.

At 840, receiver 830 (e.g., processor 265 of system 200) receives the A-MPDU subframes and performs real time operations for block acknowledgement (BA).

At 842, receiver 830 determines whether an A-MPDU frame is intended for receiver 830 by verifying received MAC headers using Salt_ota.

At 844, receiver 830 prepares and transmits BA (e.g., stateless BA) based on OTA values of: MAC addresses, TID, and/or SN of the received A-MPDU frames.

At 850, receiver 830 restores MAC headers that were randomized: TA, RA, SN, PN, and/or TID. Fields in Frame Control field 310 and/or QoS Control field 320 that correspond to MAC header bits 330 that were populated with corresponding OTA values and/or patterns cannot yet be restored as the corresponding actual values are still encrypted in the payload.

At 855, receiver 830 decrypts the received A-MPDU subframe payload.

At 860, receiver 830 checks real time MAC header bits 336 and static MAC header bits 332 of MAC header bits 330. In some embodiments, the actual values in MAC header bits 330 are restored (e.g., set or inserted) in the corresponding fields in Frame Control field 310 and/or QoS Control field 320 may have been populated with corresponding OTA values and/or patterns: TID field 452, A-MSDU present field 458, retry field 412, PM field 414, MD field 416, EOSP field 454, ACK policy indicator 456, and/or +HTC field 418.

At 865, receiver 830 performs MPDU duplicate detection, and reorders MPDUs according to TID and SN values.

At 870, receiver 830 checks PN order of packets, and checks for each packet: source address (SA)=received from secure A-MSDU, and destination address (DA)=received from secure A-MSDU.

At 875, receiver 830 transmits the packets to internet/application 875.

Figure 9:
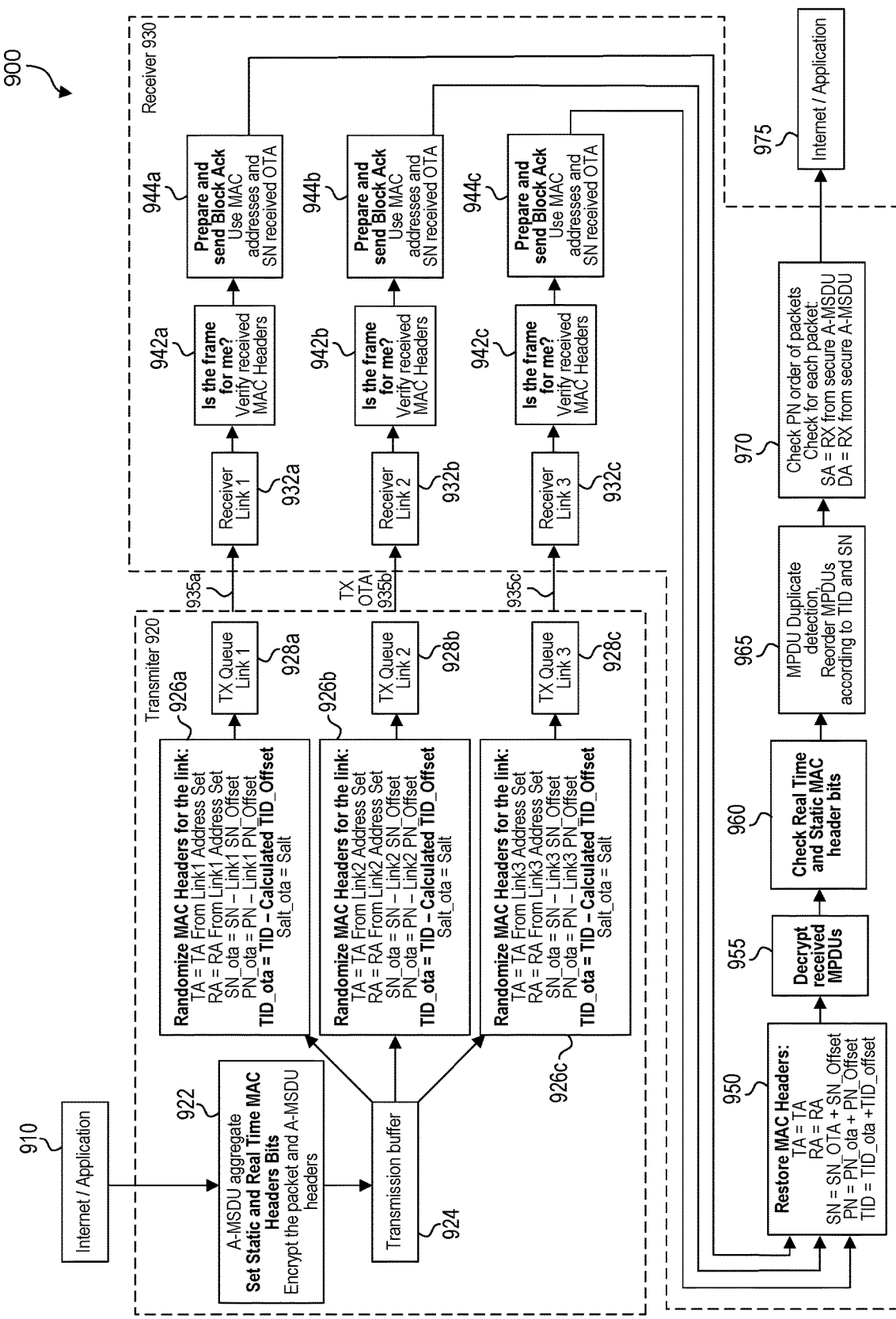
FIG. 9 illustrates an example multi-link transmitter and multi-link receiver supporting encryption of MAC header fields for WLAN privacy enhancement, according to some embodiments of the disclosure.

FIG. 9 illustrates an example 900 with multi-link transmitter 920 and multi-link receiver 930 supporting encryption of MAC header fields for WLAN privacy enhancement, according to some embodiments of the disclosure. For explanation purposes and not a limitation, FIG. 9 may be described with reference to elements from other figures in the disclosure. For example, transmitter 920 can be AP MLD 110 with AP 112, AP 114, and AP 116, and/or non-AP MLD STA 120 with STA 122, STA 124, STA 126 of FIG. 1. For example, receiver 930 can be AP MLD 110 with AP 112, AP 114, and AP 116, and/or non-AP MLD STA 120 with STA 122, STA 124, STA 126 of FIG. 1. Transmitter 920 and/or receiver 930 can be system 200 of FIG. 2. Functions of example 900 mirror example 800 but with multiple links.

Example 900 includes transmitter 920 that receives one or more A-MPDU frames from internet/application 910, supports encryption of MAC header fields for WLAN privacy enhancement, and transmits the one or more A-MPDUs OTA via different links, 935a, 935b, and 935c, with encrypted MAC header bits 330 of FIG. 3A to receiver 930. Receiver 930 supports decryption of MAC header fields for WLAN privacy enhancement, and transmits the one or more A-MPDU frames to internet/application 975. In some embodiments, real time operation for block acknowlement (BA) 940 does not require receiver 930 to decrypt an A-MPDU frame before transmitting BA. In other words, receiver 930 can transmit BA based on unencrypted field information (e.g., OTA values). In some embodiments A-MPDU support in association signaling defines whether multi-TID data and BA may be transmitted in a corresponding link.

The functions of transmitter 920 and receiver 930 are described further below.

At 922, transmitter 920 (e.g., processor 265 of system 200) can receive and aggregate MSDUs to form A-MSDU as payload 340 of an A-MPDU subframe. Transmitter 920 sets static MAC header bits 332 and/or real time MAC header bits 336 of MAC header bits 330 that are included in payload 340 of the A-MPDU subframe. In some embodiments, transmitter 920 obtains corresponding actual values in fields of Frame Control field 310 and/or QoS Control field 320 and copies or inserts the corresponding actual values into the respective MAC header bits 330. Transmitter 920 encrypts the packet and A-MSDU headers. For example, transmitter encrypts payload 340 of MAC frame 300 as shown in FIG. 3A.

At 924, transmitter 920 transmits the packet to transmission buffer(s).

At 926a (and respectively 926b and 926c), transmitter 920 randomizes fields in Frame Control field 310 and/or QoS Control field 320 that correspond to MAC header bits 330. For example, the following fields may be populated with corresponding OTA values and/or patterns: TID field 452, A-MSDU present field 458, retry field 412, PM field 414, MD field 416, EOSP field 454, ACK policy indicator 456, and/or +HTC field 418. Other fields in the MAC header that can be randomized include transmitter address (TA), receiver address (RA), sequence number (SN), packet number (PN), and a Salt.

The randomization may be according to a respective link 935a, 935b, and 935c. The randomization may include determining a randomized value (e.g., offset value), inserting all zeroes, or using a predefined value (e.g., dummy value). In some examples, an OTA value is determined based on an actual value and randomized and/or predefined value.

In some embodiments, a TID_Offset can be determined via randomization. The TID_OTA value can be determined from the actual value of a TID field and a calculated TID_Offset value (e.g., randomized value). In the event transmitter 920 transmits multi-TID A-MPDU, transmitter 920 sets the same TID_OTA value to QoS Control field 320 for the A-MPDUs with the same TID (e.g., all A-MPDU frames belonging to the same TID will have the same TID_OTA value.) The TID_OTA value may be changed for each transmitted PPDU or they may be configured for a period of time to the transmitter and the receiver.

At 928, transmitter 820 transmits the A-MPDU subframes to respective transmission queues 928a, 928b, and 928c.

At 935, transmitter 920 transmits the A-MPDU subframes OTA via respective link 935a, 935b, and 935c.

At 932, receiver 930 (e.g., processor 265 of system 200) receives the respective A-MPDU subframes and performs real time operations for block acknowledgement (BA) for respective receiver links at 932a, 932b, and 932c.

At 942a (and respectively 942b and 942c) receiver 930 determines whether a respective A-MPDU frame is intended for receiver 930 by verifying received MAC headers using Salt_ota.

At 944a (and respectively 944b and 944c), receiver 930 prepares and transmits BA (e.g., stateless BA) based on OTA values of MAC addresses, TID, and/or SN of the received A-MPDU frames.

At 950, receiver 930 restores MAC headers that were randomized: TA, RA, SN, PN, and/or TID. Fields in Frame Control field 310 and/or QoS Control field 320 that correspond to MAC header bits 330 that were populated with corresponding OTA values and/or patterns cannot yet be restored as the corresponding actual values are still encrypted in the payload.

At 955, receiver 930 decrypts the received A-MPDU subframe payload.

At 960, receiver 930 checks real time MAC header bits 336 and static MAC header bits 332 of MAC header bits 330. In some embodiments, the actual values in MAC header bits 330 are restored (e.g., set or inserted) in the corresponding fields in Frame Control field 310 and/or QoS Control field 320 may have been populated with corresponding OTA values and/or patterns: TID field 452, A-MSDU present field 458, retry field 412, PM field 414, MD field 416, EOSP field 454, ACK policy indicator 456, and/or +HTC field 375.

At 965, receiver 930 performs MPDU duplicate detection, and reorders MPDUs according to TID and SN values.

At 970, receiver 930 checks PN order of packets, and checks for each packet: source address (SA)=received from secure A-MSDU, and destination address (DA)=received from secure A-MSDU.

At 975, receiver 930 transmits the packets to internet/application 975.

Figure 11:
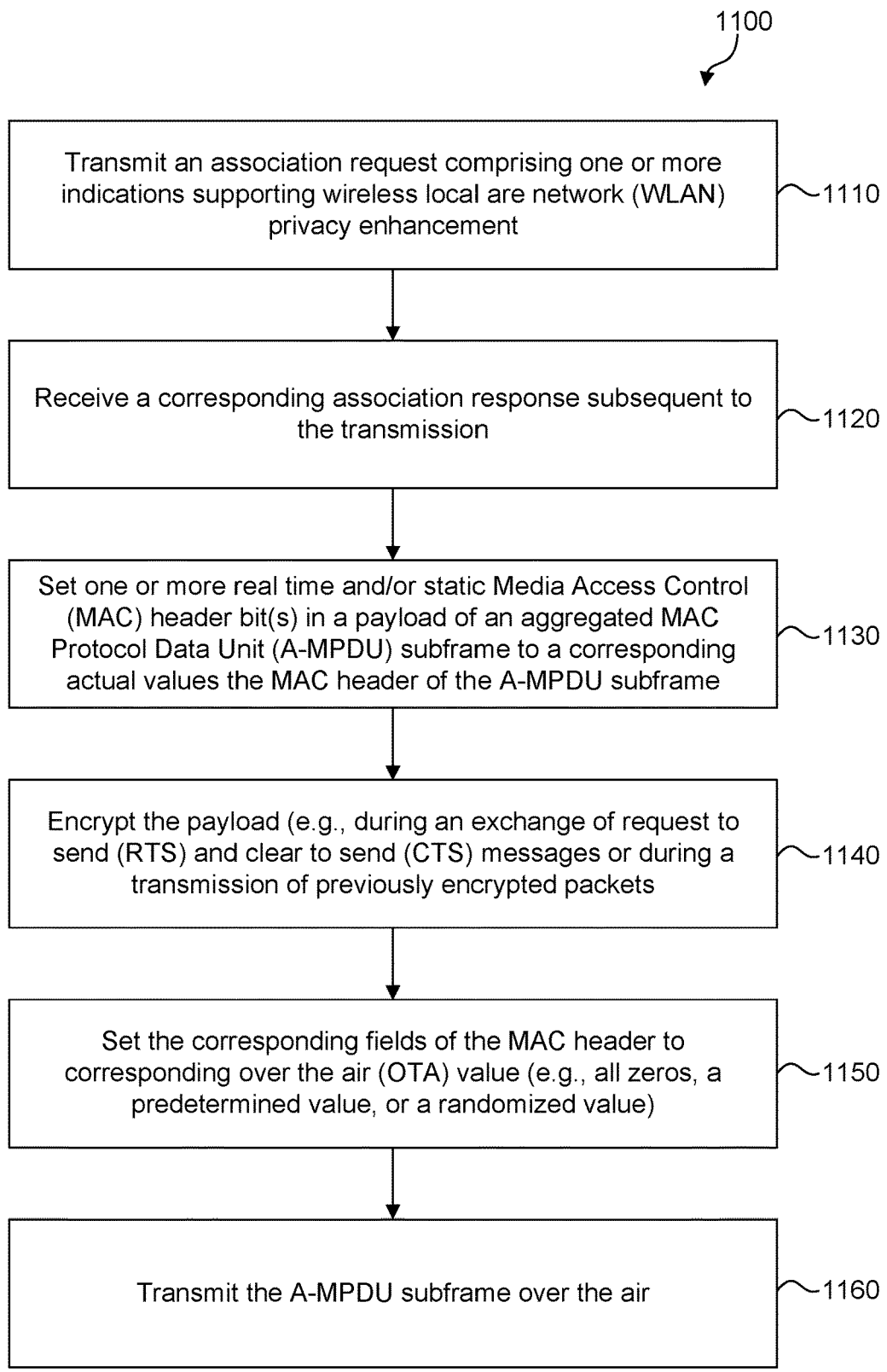
FIG. 11 illustrates an example method for a transmitter supporting encryption of MAC header fields for WLAN privacy enhancement, according to some embodiments of the disclosure.

FIG. 11 illustrates method 1100 for a transmitter supporting encryption of MAC header fields for WLAN privacy enhancement, according to some embodiments of the disclosure. For explanation purposes and not a limitation, FIG. 11 may be described with reference to elements from other figures in the disclosure. For example, method 1100 can be performed by AP MLD 110, AP 112, AP 114, AP 116, AP 110 that includes a single transceiver, non-AP MLD STA 120, STA 122, STA 124, STA 126, or STA 140 of FIG. 1. In some embodiments, method 1100 can be performed by system 200 of FIG. 2.

At 1110, system 200 can transmit an association request comprising one or more indications supporting WLAN privacy enhancement.

At 1120, system 200 can receive a corresponding association response subsequent to the transmission.

At 1130, system 200 can set one or more bits of real time MAC header bits 336 and/or static MAC header bits 332 in payload 340 of an A-MPDU subframe to corresponding actual values of fields in header 315 of the A-MPDU subframe. For example, real time MAC header bits 336 in the payload can include corresponding actual values from fields in header 315, wherein the fields included: a retry field, a PM field a MD field, an EOSP field, an ACK policy indicator field, +HTC field, and/or a reserved field. Static MAC header bits in payload 340 can include to a corresponding actual value from a field in header 315 such as a TID field or an A-MSDU present field.

At 1140, system 200 can encrypt payload 340 (e.g., during an exchange of request to send (RTS) and clear to send (CTS) messages or during a transmission of previously buffered packets).

At 1150, system 200 can determine and/or set fields in header 315 that correspond to MAC header bits 330 with corresponding OTA values (e.g., all zeros, a predetermined value, or a randomized value) and/or patterns. The fields in header 315 can include: TID field 452, A-MSDU present field 458, retry field 412, PM field 414, MD field 416, EOSP field 454, ACK policy indicator 456, and/or +HTC field 418. Other fields in header 315 that can be randomized include transmitter address (TA), receiver address (RA), sequence number (SN), packet number (PN), and/or a Salt.

At 1160, system 200 can transmit the A-MPDU subframe over the air.

Figure 12:
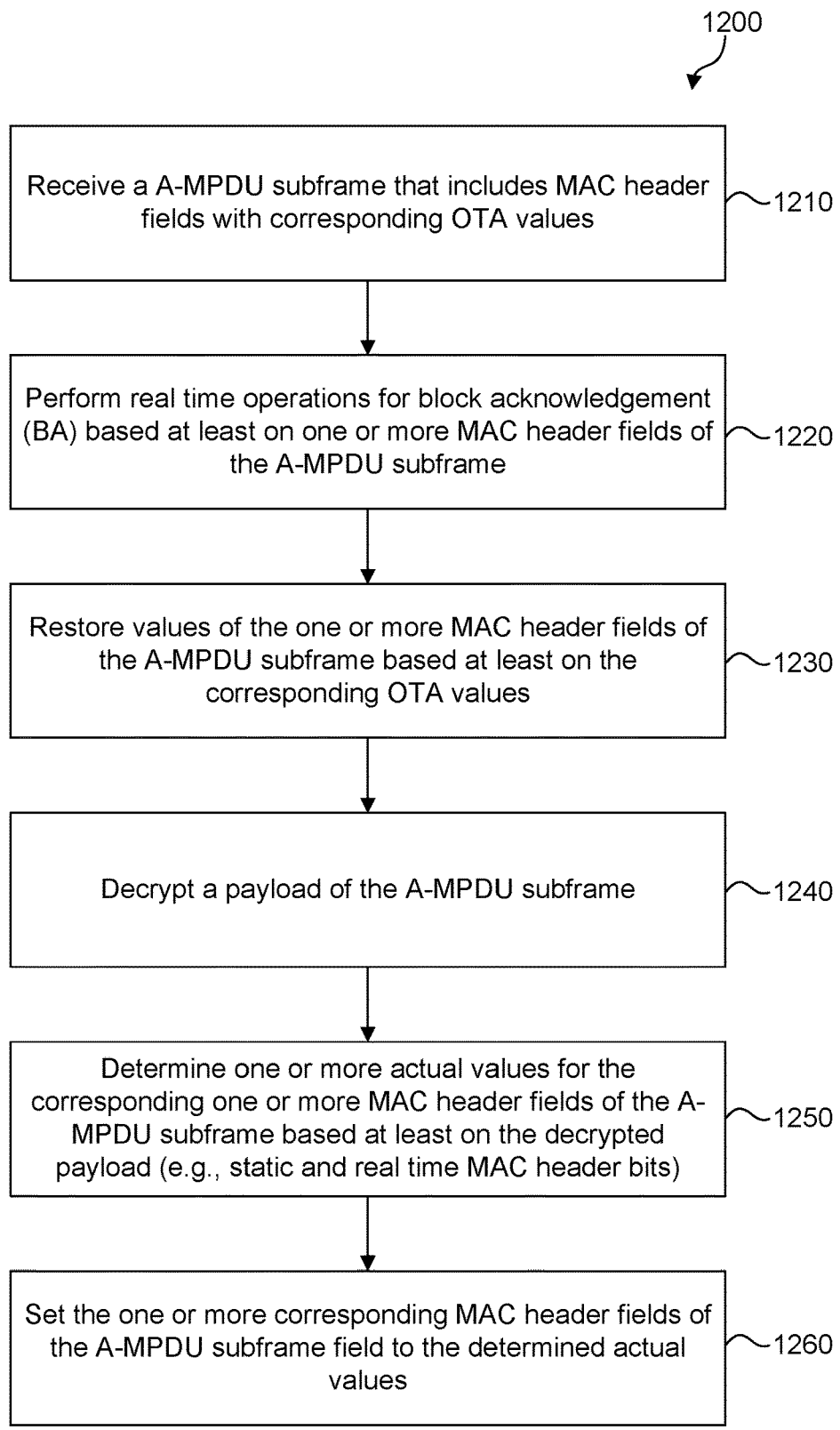
FIG. 12 illustrates an example method for a receiver supporting encryption of MAC header fields for WLAN privacy enhancement, non-AP MLD for GCR-MLO, according to some embodiments of the disclosure.

FIG. 12 illustrates method 1200 for a receiver supporting encryption of MAC header fields for WLAN privacy enhancement, non-AP MLD for GCR-MLO, according to some embodiments of the disclosure. For explanation purposes and not a limitation, FIG. 12 may be described with reference to elements from other figures in the disclosure. For example, method 1200 can be performed by AP MLD 110, AP 112, AP 114, AP 116, AP 110 that includes a single transceiver, non-AP MLD STA 120, STA 122, STA 124, STA 126, or STA 140 of FIG. 1. In some embodiments, method 1200 can be system 200 of FIG. 2.

At 1210, system 200 can receive a A-MPDU subframe that includes header 315 with fields including OTA values.

At 1220, system 200 can perform real time operations for block acknowledgement (BA) based at least on one or more OTA values in header 315.

At 1230, system 200 can restore values of the one or more fields of header 315 (e.g., TA, RA, SN, PA, salt, and/or TID) based at least on the corresponding OTA values.

At 1240, system 200 can decrypt payload 340 of the A-MPDU subframe.

At 1250, system 200 can determine one or more actual values for the corresponding one or more fields of header 315 based at least on the decrypted payload (e.g., static MAC header bits 332 and real time MAC header bits 336 of MAC header bits 330).

At 1260, system 200 can set the one or more corresponding fields of header 315 to the determined actual values. The fields can include TID field 452, A-MSDU present field 458, retry field 412, PM field 414, MD field 416, EOSP field 454, ACK policy indicator 456, and/or +HTC field 418.

Figure 10:
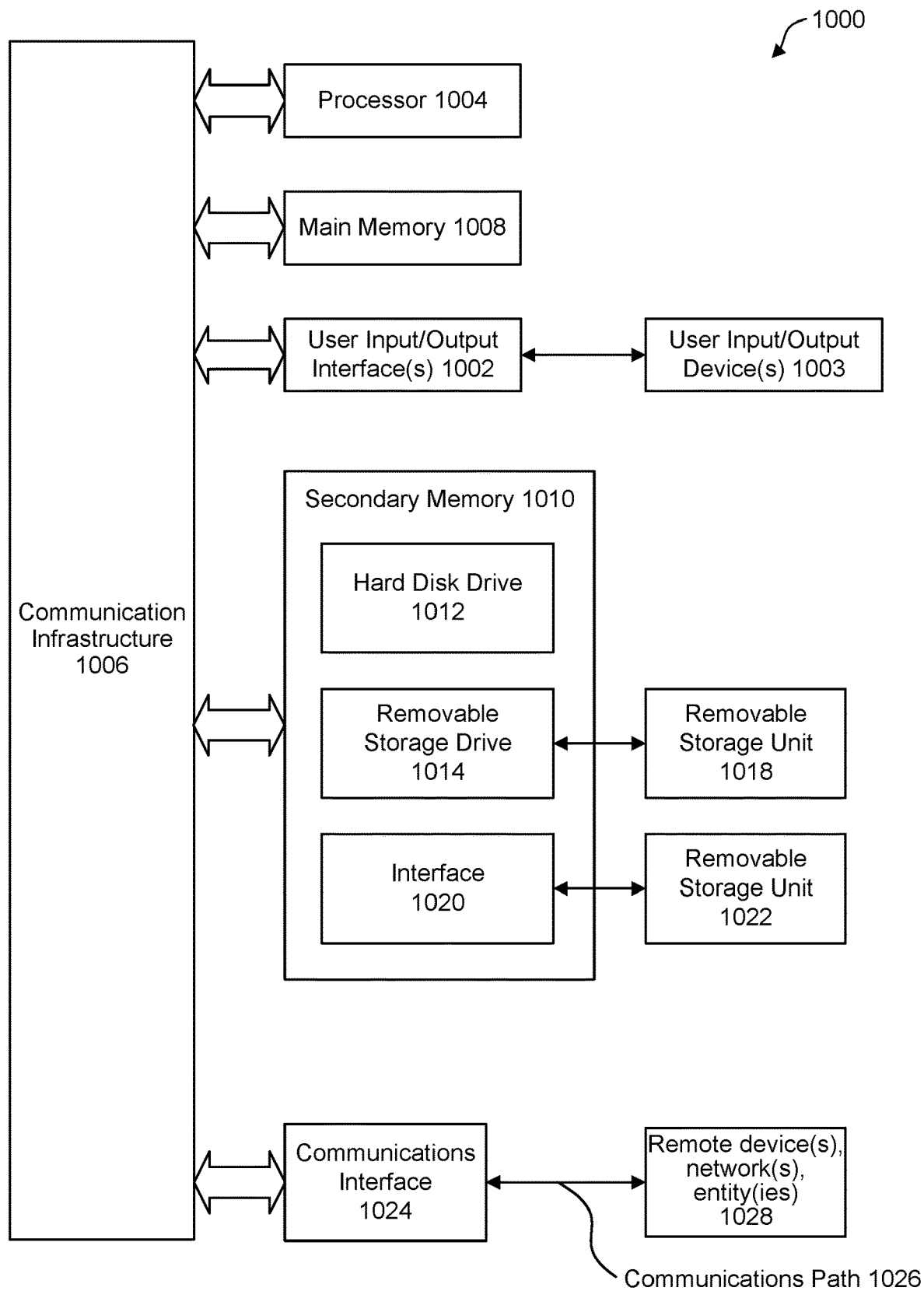
FIG. 10 is an example computer system for implementing some embodiments or portion(s) thereof.

Various embodiments can be implemented, for example, using one or more well-known computer systems, such as computer system 1000 shown in FIG. 10. Computer system 1000 can be any well-known computer capable of performing the functions described herein. For example, and without limitation, system 200 of FIG. 2, method 1100 of FIG. 11, method 1200 of FIG. 12 (and/or other apparatuses and/or components shown in the figures) may be implemented using computer system 1000, or portions thereof.

Computer system 1000 includes one or more processors (also called central processing units, or CPUs), such as a processor 1004. Processor 1004 is connected to a communication infrastructure 1006 that can be a bus. One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002. Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some embodiments, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A station (STA), comprising:
a transceiver; and
a processor communicatively coupled to the transceiver, configured to:
set a bit of a real time Media Access Control (MAC) header in a payload of an aggregated MAC Protocol Data Unit (A-MPDU) subframe to an actual value associated with a power management (PM) field in a header of the A-MPDU subframe;
set a bit of one or more static MAC header bits in the payload to a corresponding actual value associated with a field in the header, wherein the field comprises a traffic ID (TID) field;
encrypt the payload;
subsequent to encrypting the payload, set the PM field in the header to an over the air (OTA) PM value; and
transmit, via the transceiver, the A-MPDU subframe.

2. The STA of claim 1, wherein the processor is further configured to:
set a second bit of one or more static MAC header bits in the payload to a second corresponding actual value associated with a second field in the header, wherein the second field comprises an aggregated MAC service data unit (A-MSDU) present field.

3. The STA of claim 1, wherein the real time MAC header further comprises one or more bits corresponding to an actual value from one or more additional fields in the header, wherein the one or more additional fields comprise: a retry field, a more data (MD) field, an end of service period (EOSP) field, an ACK policy indicator field, or a +HTC field; and
the processor is further configured to, subsequent to encrypting the payload, set the one or more additional fields in the header to corresponding OTA values.

4. The STA of claim 3, wherein a corresponding OTA value of the corresponding OTA values comprises: all zeros, a predetermined value, or a randomized value.

5. The STA of claim 1, wherein encrypting the payload occurs during an exchange of a request to send (RTS) message and a clear to send (CTS) message.

6. The STA of claim 1, wherein encrypting the payload occurs during a transmission of previously buffered packets.

7. The STA of claim 1, wherein the processor is further configured to:
receive, via the transceiver, a second A-MPDU subframe;
perform one or more real time operations for block acknowledgement (BA) based at least on one or more OTA values in a second header of the second A-MPDU subframe, wherein the one or more OTA values comprise a traffic identifier (TID) OTA value; and
restore a TID field value in the second header based at least on the TID OTA value.

8. The STA of claim 1, wherein the processor is further configured to:
receive, via the transceiver, a second A-MPDU subframe comprising a second PM field in a second header that includes a second OTA PM value;
decrypt a second payload of the second A-MPDU subframe;
determine a second actual value for the second PM field based at least on decrypting the second payload; and
set the second PM field in the second header to the second actual value.

9. The STA of claim 8, wherein the processor is further configured to:
transmit, via the transceiver, a corresponding block acknowledgement, wherein a minimum time for the determination begins at the reception of the second A-MPDU subframe and ends after a short interframe space (SIFS) subsequent to the corresponding block acknowledgement.

10. The STA of claim 8, wherein the processor is further configured to:
determine a value of an end of service period (EOSP) field or a more data (MD) field based at least on decrypting the second payload, wherein an earliest time for the STA to return to a doze state begins at the reception of the second A-MPDU subframe and ends after a corresponding block acknowledgement.

11. The STA of claim 1, wherein the processor is further configured to:
transmit, via the transceiver, an association request including a set of indications comprising: real time MAC header bits encryption in transmission supported, real time MAC header bits decryption in reception supported, static MAC header bits encryption in transmission supported, or static MAC header bits decryption in reception supported; and
receive, via the transceiver, an association response subsequent to the transmission.

12. An access point (AP), comprising:
a transceiver; and
a processor communicatively coupled to the transceiver, configured to:
set a bit of a real time Media Access Control (MAC) header in a payload of an aggregated MAC Protocol Data Unit (A-MPDU) subframe to an actual value associated with a power management (PM) field in a header of the A-MPDU subframe;
set a bit of one or more static MAC header bits in the payload to a corresponding actual value associated with a field in the header, wherein the field comprises a traffic ID (TID) field;
encrypt the payload;
subsequent to encrypting the payload, set the PM field in the header to an over the air (OTA) PM value; and
transmit, via the transceiver, the A-MPDU subframe.

13. The AP of claim 12, wherein the processor is further configured to set a second bit of one or more static MAC header bits in the payload to a second corresponding actual value associated with a second field in the header, wherein the second field comprises an aggregated MAC service data unit (A-MSDU) present field.

14. The AP of claim 12, wherein the real time MAC header further comprises one or more bits corresponding to an actual value from one or more additional fields in the header, wherein the one or more additional fields comprise: a retry field, a more data (MD) field, an end of service period (EOSP) field, an ACK policy indicator field, or a +HTC field; and
the processor is further configured to, subsequent to encrypting the payload, set the one or more additional fields to corresponding OTA values.

15. The AP of claim 12, wherein encrypting the payload occurs during an exchange of a request to send (RTS) message and a clear to send (CTS) message or during a transmission of previously buffered packets.

16. The AP of claim 12, wherein the processor is further configured to:
receive, via the transceiver, a second A-MPDU subframe comprising a second PM field in a second header that includes a second OTA PM value;
decrypt a second payload of the second A-MPDU subframe;
determine a second actual value for the second PM field based at least on decrypting the second payload; and
set the second PM field in the second header to the second actual value.

17. A method performed by a station (STA), comprising:
setting a bit of a real time Media Access Control (MAC) header in a payload of an aggregated MAC Protocol Data Unit (A-MPDU) subframe to an actual value associated with a power management (PM) field in a header of the A-MPDU subframe;
setting a bit of one or more static MAC header bits in the payload to a corresponding actual value associated with a field in the header, wherein the field comprises a traffic ID (TID) field;
encrypting the payload;
subsequent to encrypting the payload, setting the PM field in the header to an over the air (OTA) PM value; and
transmitting the A-MPDU subframe.

18. The method of claim 17, wherein the real time MAC header further comprises one or more bits corresponding to an actual value from one or more additional fields in the header, wherein the one or more additional fields comprise: a retry field, a more data (MD) field, an end of service period (EOSP) field, an ACK policy indicator field, or a +HTC field; and
subsequent to encrypting the payload, setting the one or more additional fields in the header to corresponding OTA values.

19. The method of claim 17, wherein the encrypting the payload occurs during an exchange of a request to send (RTS) message and a clear to send (CTS) message or during a transmission of previously buffered packets.

20. The method of claim 17, further comprising:
receiving a second A-MPDU subframe comprising a second PM field in a second header that includes a second OTA PM value;
decrypting a second payload of the second A-MPDU subframe;
determining a second actual value for the second PM field based at least on decrypting the second payload; and
setting the second PM field in the second header to the second actual value.

* * * * *